United States Patent
Yanase et al.

(10) Patent No.: US 7,083,496 B2
(45) Date of Patent: Aug. 1, 2006

(54) GEAR GRINDING MACHINE

(75) Inventors: Yoshikoto Yanase, Ritto (JP);
Toshifumi Katsuma, Ritto (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 11/174,631

(22) Filed: Jul. 6, 2005

(65) Prior Publication Data

US 2006/0025050 A1 Feb. 2, 2006

(30) Foreign Application Priority Data

Jul. 29, 2004 (JP) ............................. 2004-222220

(51) Int. Cl.
*B24B 53/075* (2006.01)

(52) U.S. Cl. ............................ 451/5; 451/47; 451/72

(58) Field of Classification Search ................ 451/5, 451/21, 47, 56, 72, 222; 125/11.01, 11.04
See application file for complete search history.

(56) References Cited

U.S. PATENT DOCUMENTS

| 5,076,020 | A | * | 12/1991 | Negri | 451/21 |
| 5,857,894 | A | * | 1/1999 | Griesbach et al. | 451/5 |
| 5,954,568 | A | * | 9/1999 | Wirz | 451/47 |
| 6,217,409 | B1 | * | 4/2001 | Stadtfeld et al. | 451/5 |
| 6,234,880 | B1 | * | 5/2001 | Scacchi | 451/47 |
| 6,290,574 | B1 | * | 9/2001 | Thyssen | 451/9 |
| 6,491,568 | B1 | * | 12/2002 | Jankowski | 451/5 |
| 6,565,418 | B1 | * | 5/2003 | Feisel | 451/10 |
| 2003/0166377 | A1 | * | 9/2003 | Schmid | 451/5 |

* cited by examiner

*Primary Examiner*—Robert A. Rose
(74) *Attorney, Agent, or Firm*—Birch, Stewart, Kolasch & Birch, LLP

(57) ABSTRACT

To correct the tooth profile error of a ground gear, the wheel angle of a threaded grinding wheel is modified by dressing the threaded grinding wheel by a dressing device. To correct the helix form deviation of a ground gear, namely, to modify the helix angle of the gear, synchronization between the moving motion in the Z-direction of the threaded grinding wheel and the rotary motion of a table for installation of the gear is adjusted. When the helix form deviation is corrected by adjustment of the synchronization, a tooth profile change inevitably occurs. In consideration of the tooth profile change, correction of the tooth profile error by dressing is made.

3 Claims, 7 Drawing Sheets

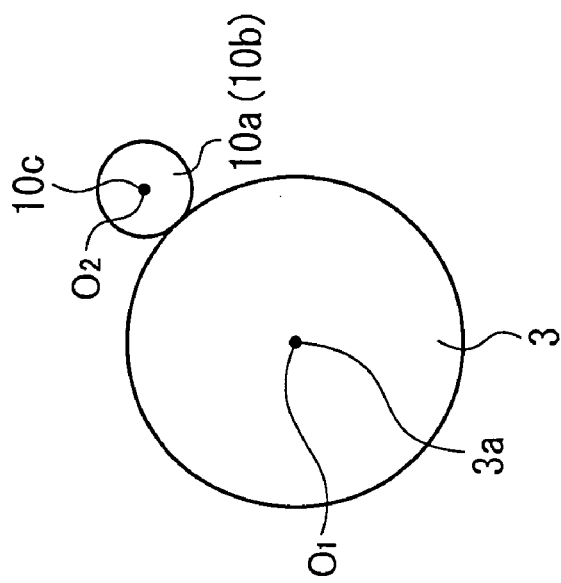
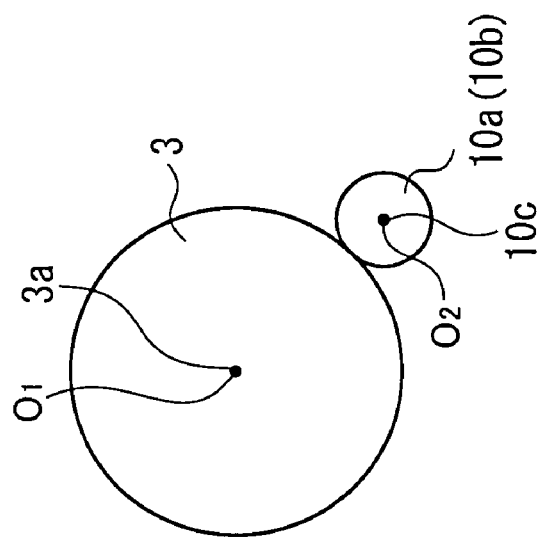
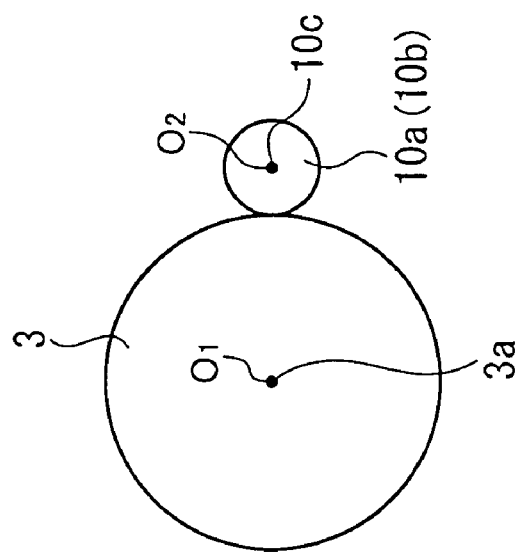
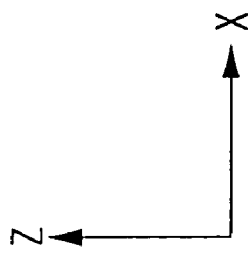

GEAR GRINDING MACHINE

BACKGROUND OF THE INVENTION

1. Field of the Invention

This invention relates to a gear grinding machine arranged to perform gear grinding (gear machining) using a threaded grinding wheel, and equipped with a dressing device for dressing the threaded grinding wheel. The gear grinding machine can easily correct an error (dimensional error), if any, in a ground area.

2. Description of the Related Art

A gear grinding machine, in which a gear-shaped workpiece after heat treatment is ground by "a threaded grinding wheel", a gear grinding tool, to finish a gear, has so far been known. The threaded grinding wheel is an annular grinding wheel having threads (rack teeth) formed spirally on its outer peripheral surface. Grinding is performed by numerically controlling the positions in an orthogonal coordinate system (positions on the X-axis, Y-axis and Z-axis) of the threaded grinding wheel, the rotational speed of the threaded grinding wheel, and the rotational speed of a table on which the work (gear) has been installed.

As grinding proceeds, the threaded grinding wheel wears, and its sharpness decreases. Thus, after the threaded grinding wheel has ground many gears continuously, the worn-out threaded grinding wheel needs to be dressed by a dressing device to regenerate a sharp cutting edge.

Some gear grinding machines are equipped with dressing devices. Among the dressing devices is a rotary dressing device provided with a rotationally driven disk-shaped dressing tool. With this rotary dressing device, the disk-shaped dressing tool is kept rotationally driven, and brought into contact with the flank of the thread of the threaded grinding wheel being rotated, thereby carrying out dressing.

If the shape of the ground gear is not the target shape, but has a shape error, actions of the gear grinding machine need to be modified.

In this case, the "gear shape error" includes a "tooth profile error" and a "helix form deviation".

To correct the "tooth profile error" of the gear to be ground, namely, to modify its tooth profile (tooth profile pressure angle), the wheel pressure angle of the threaded grinding wheel has to be modified. Modification of the wheel pressure angle of the threaded grinding wheel is made by dressing the threaded grinding wheel by the dressing device.

To correct the "helix form deviation" of the gear to be ground, on the other hand, it is common practice to modify synchronous motions made when the gear (work) placed on a rotating table is ground by the threaded grinding wheel. That is, the helix form deviation can be corrected by modifying synchronization between motions of the threaded grinding wheel moving in a Z-axis direction (i.e., vertical direction), and rotary motions of the table, on which the work is placed, during grinding.

Concretely, the moving motion in the Z-axis direction of the threaded grinding wheel is slowed, or the rotary motion of the table is quickened, whereby the helix angle of the gear is increased. On the other hand, the moving motion in the Z-axis direction of the threaded grinding wheel is increased, or the rotary motion of the table is slowed, whereby the helix angle of the gear is decreased. Thus, the synchronization between the moving motion in the Z-axis direction of the threaded grinding wheel and the rotary motion of the table is adjusted, whereby the helix angle of the gear can be arbitrarily set and modified. By so adjusting the synchronization, the helix angle of the gear to be ground can be modified to correct the helical form deviation.

One of methods for modifying the wheel pressure angle is to turn (turn about a vertical axis (Z-axis)) the disk-shaped dressing tool in contact with the thread of the threaded grinding wheel, although details will be described later.

Among gear grinding machines, therefore, are those of the type having a mechanism for turning the rotary dressing device. With the gear grinding machine having such a turning mechanism, an operator manually turns the rotary dressing device (dressing tool) about the Z-axis by use of a block gauge, which is a tool for turning, to modify the wheel pressure angle.

When the wheel pressure angle of the threaded grinding wheel is modified to correct the tooth profile error, the tooth profile can be modified. Such correction of the tooth profile error does not affect the form of the tooth trace.

If the synchronization between the moving motion in the Z-axis direction of the threaded grinding wheel and the rotary motion of the table is modified to correct the helix form deviation, on the other hand, the form of the tooth trace can be modified. Such correction of the helix form deviation inevitably results in the modification of the tooth profile. Since the correction of the helix form deviation leads to modification of the tooth profile, as described above, an unintended tooth profile may be obtained.

The present invention has been accomplished in light of the above-described problems with the earlier technologies. It is an object of the present invention to provide a gear grinding machine which can appropriately correct a tooth profile error and a helix form deviation in anticipation of a change in a tooth profile according to correction of the helix form deviation, if there is an error or deviation of the tooth profile and the tooth trace form.

SUMMARY OF THE INVENTION

An aspect of the present invention is a gear grinding machine comprising:

a table on which a work is installed, and which rotates about a vertical axis;

a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to the table, a Z-direction being a vertical direction, and a Y-direction being a direction perpendicular to the X-direction and the Z-direction, and to turn the threaded grinding wheel in a Y-Z plane;

an NC device for numerically controlling the movement of the moving mechanism in order to control the position of the threaded grinding wheel mounted on the moving mechanism, and for numerically controlling the rotary motion of the table; and a rotary dressing device having a disk-shaped dressing tool, and arranged such that when the rotary dressing device is set at a position where the table has been placed, the dressing tool contacts the flank of the threads of the threaded grinding wheel, while being rotationally driven, to perform dressing, and wherein the NC device has an input function unit for inputting a tooth profile error and a helix form deviation representing a dimensional error of a gear machined by the gear grinding machine, a tooth profile deformation amount computing function unit for finding a tooth profile deformation amount generated in the gear when adjusting synchronization between a moving motion in a Z-axis direction of the threaded grinding wheel and the rotary motion of the table so as to correct the helix form deviation, an addition function unit for adding the inputted tooth profile error and the tooth profile deformation amount to find a total tooth profile error, a pressure angle error computing function unit for finding a pressure angle error corresponding to the total tooth profile error, a helix angle modification amount computing function unit for finding a helix angle modification amount necessary for correcting the inputted helix form deviation, and an NC control function unit for adjusting the synchronization between the moving motion in the Z-axis direction of the threaded grinding wheel and the rotary motion of the table so that a helix angle formed in the work is changed by the helix angle modification amount.

Another aspect of the present invention is a gear grinding machine comprising:

a table on which a work is installed, and which rotates about a vertical axis;

a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to the table, a Z-direction being a vertical direction, and a Y-direction being a direction perpendicular to the X-direction and the Z-direction, and to turn the threaded grinding wheel in a Y-Z plane;

an NC device for numerically controlling the movement of the moving mechanism in order to control the position of the threaded grinding wheel mounted on the moving mechanism, and for numerically controlling the rotary motion of the table; and a rotary dressing device having a disk-shaped dressing tool, and arranged such that when the rotary dressing device is set at a position where the table has been placed, the dressing tool contacts the flank of the threads of the threaded grinding wheel, while being rotationally driven, to perform dressing, and wherein the NC device has an input function unit for inputting a tooth profile error and a helix form deviation representing a dimensional error of a gear machined by the gear grinding machine, a tooth profile deformation amount computing function unit for finding a tooth profile deformation amount generated in the gear when adjusting synchronization between a moving motion in a Z-axis direction of the threaded grinding wheel and the rotary motion of the table so as to correct the helix form deviation, an addition function unit for adding the inputted tooth profile error and the tooth profile deformation amount to find a total tooth profile error, a pressure angle error computing function unit for finding a pressure angle error corresponding to the total tooth profile error, a pressure angle modification amount computing function unit for finding a pressure angle modification amount necessary for correcting the pressure angle error, a grinding wheel position correction amount computing function unit for finding a grinding wheel position correction amount corresponding to the pressure angle modification amount, a helix angle modification amount computing function unit for finding a helix angle modification amount necessary for correcting the inputted helix form deviation, and an NC control function unit for adjusting the synchronization between the moving motion in the Z-axis direction of the threaded grinding wheel and the rotary motion of the table so that a helix angle formed in the work is changed by the helix angle modification amount, and for modifying the position of the threaded grinding wheel by the grinding wheel position correction amount in correcting the tooth profile error by adjusting a position in the X-direction, a position in the Z-direction, and a turning position in the Y-Z plane of the threaded grinding wheel, while keeping the dressing tool in contact with the flank of the threads of the threaded grinding wheel.

Still another aspect of the present invention is a gear grinding machine comprising:

a table on which a work is installed, and which rotates about a vertical axis;

a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to the table, a Z-direction being a vertical direction, and a Y-direction being a direction perpendicular to the X-direction and the Z-direction, and to turn the threaded grinding wheel in a Y-Z plane;

an NC device for numerically controlling the movement of the moving mechanism in order to control the position of the threaded grinding wheel mounted on the moving mechanism, and for numerically controlling the rotary motion of the table; and a rotary dressing device having a disk-shaped dressing tool, and arranged such that when the rotary dressing device is set at a position where the table has been placed, the dressing tool contacts the flank of the threads of the threaded grinding wheel, while being rotationally driven, to perform dressing, and wherein the NC device has an input function unit for inputting a tooth profile error and a helix form deviation representing a dimensional error of a gear machined by the gear grinding machine, a tooth profile deformation amount computing function unit for finding a tooth profile deformation amount generated in the gear when adjusting synchronization between a moving motion in a Z-axis direction of the threaded grinding wheel and a rotary motion of the table so as to correct the helix form deviation, an addition function unit for adding the inputted tooth profile error and the tooth profile deformation amount to find a total tooth profile error, a pressure angle error computing function unit for finding a pressure angle error corresponding to the total tooth profile error, a pressure angle modification amount computing function unit for finding a pressure angle modification amount necessary for correcting the pressure angle error, a lead correction amount computing function unit for finding a lead correction amount corresponding to the pressure angle modification amount, a helix angle modification amount computing function unit for finding a helix angle modification amount necessary for correcting the inputted helix form deviation, and an NC control function unit for adjusting the synchronization between the moving motion in the Z-axis direction of the threaded grinding wheel and the rotary motion of the table so that a helix angle formed in the work is changed by the helix angle modification amount, and for modifying a moving distance in the Y-direction of the threaded grinding wheel per rotation of the threaded grinding wheel by the lead correction amount to adjust the moving distance in the Y-direction of the threaded grinding wheel per rotation of the threaded grinding wheel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6(a) to 6(c) are explanation drawings showing the state of dressing; and

DETAILED DESCRIPTION OF THE INVENTION

First of all, the features and general actions of a gear grinding machine, to which the present invention has been applied, will be described with reference to FIGS. 1 to 5.

Figure 1:
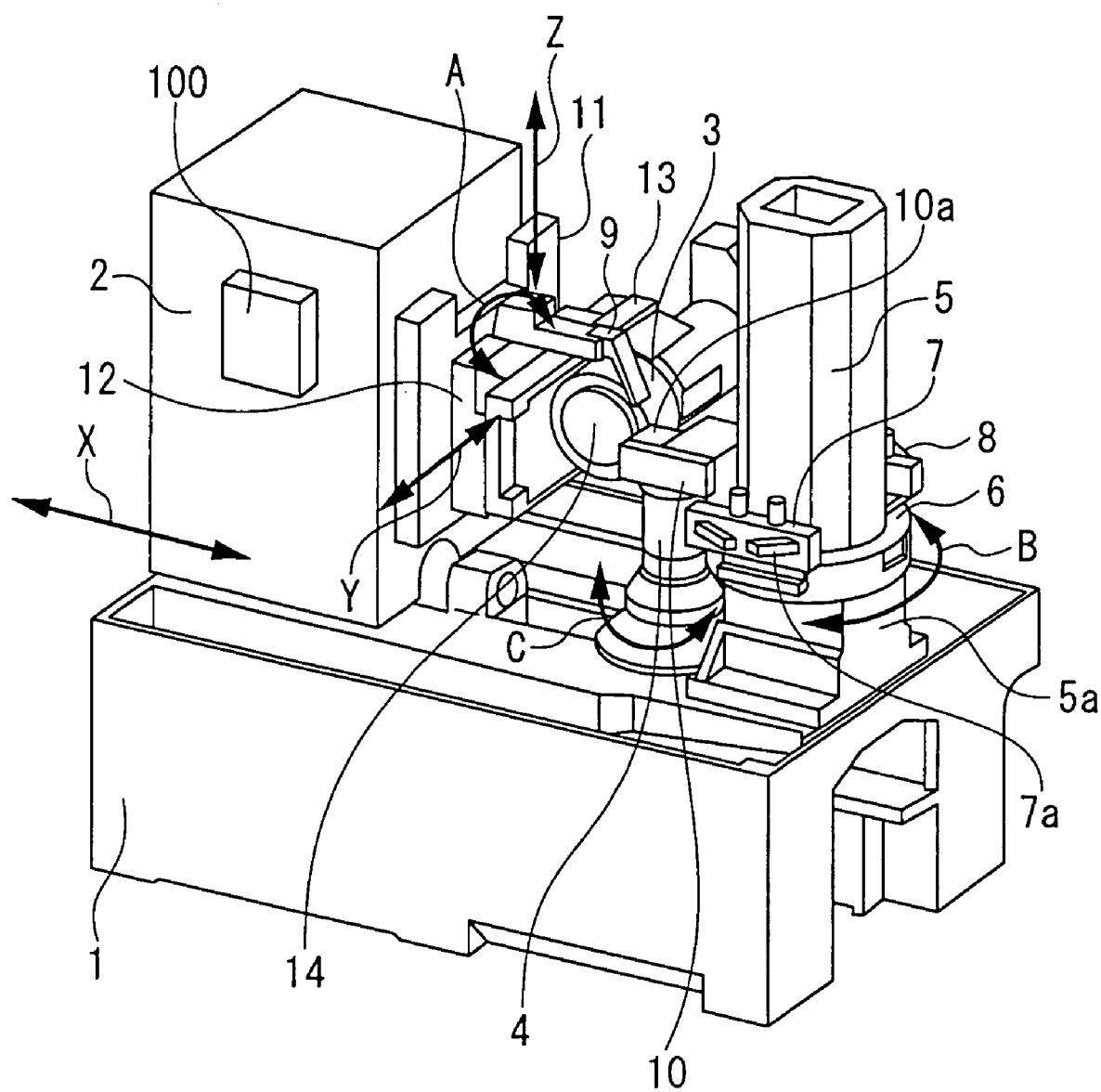
FIG. 1 is a perspective view showing a gear grinding machine.

FIG. 1 is a perspective view of a gear grinding machine according to an embodiment of the present invention having a threaded grinding wheel (worm grinding wheel) 3 mounted thereon. This view illustrates a state in which the threaded grinding wheel 3 is dressed (ground for regeneration) by a pair of dressing tools 10a and 10b provided in a rotary dressing device 10. The threaded grinding wheel 3 of an annular shape has rack teeth (spiral threads) on the outer peripheral surface thereof, and these rack teeth engage a work (gear to be ground) W to carry out gear grinding.

Figure 2A:
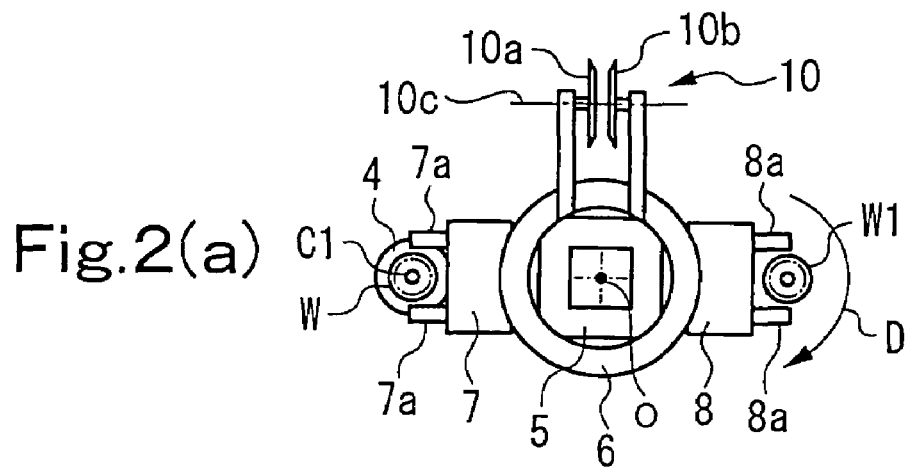
FIGS. 2(a) to 2(c) are plan views showing the surroundings of a counter column in the gear grinding machine.
Figure 2B:
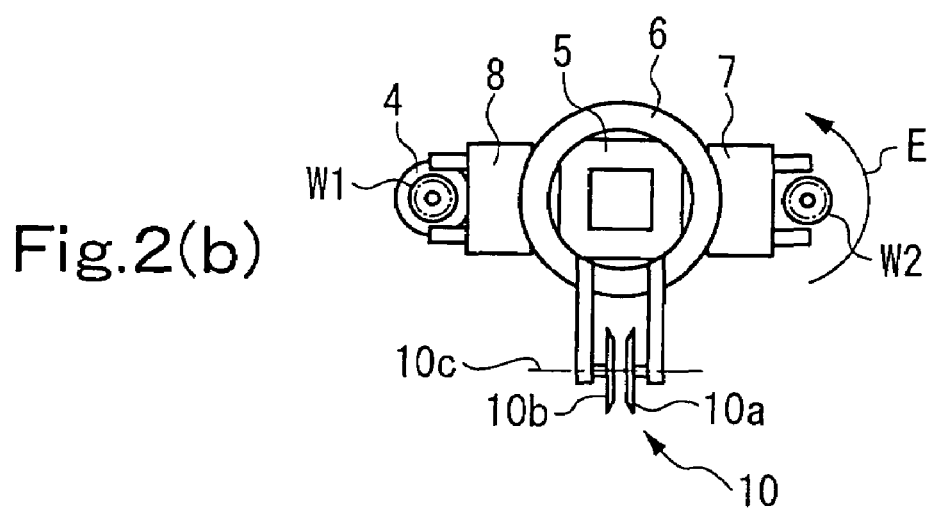
Figure 2C:
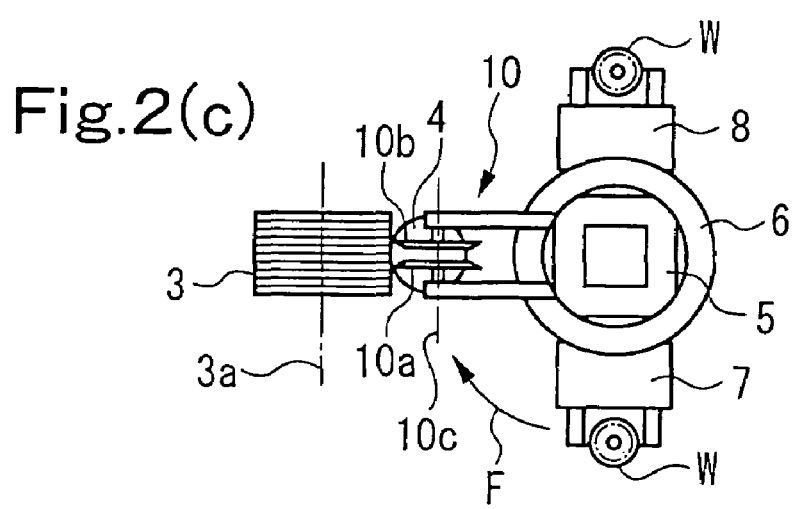

FIGS. 2(a) to 2(c) are explanation drawings of the surroundings of a counter column 5, as viewed from above, which is a tailstock for supporting an end of the work. FIGS. 2(a) and 2(b) show actions for carrying the work W into and out of a site on a table 4. FIG. 2(c) shows the state of dressing.

Figure 3:
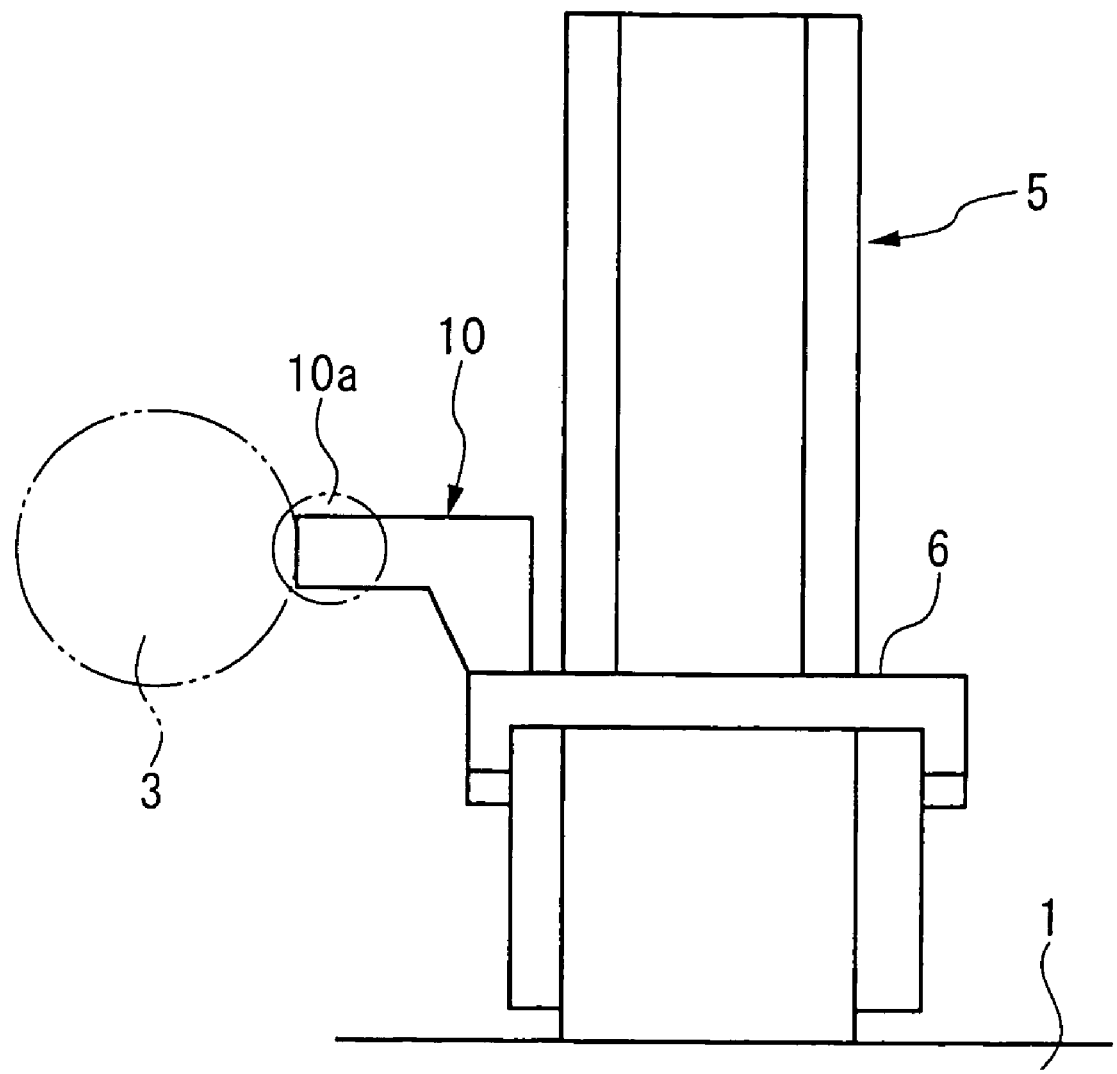
FIG. 3 is a side view showing the surroundings of the counter column in the gear grinding machine.

FIG. 3 is a side view of the counter column (tailstock) 5.

Figure 4:
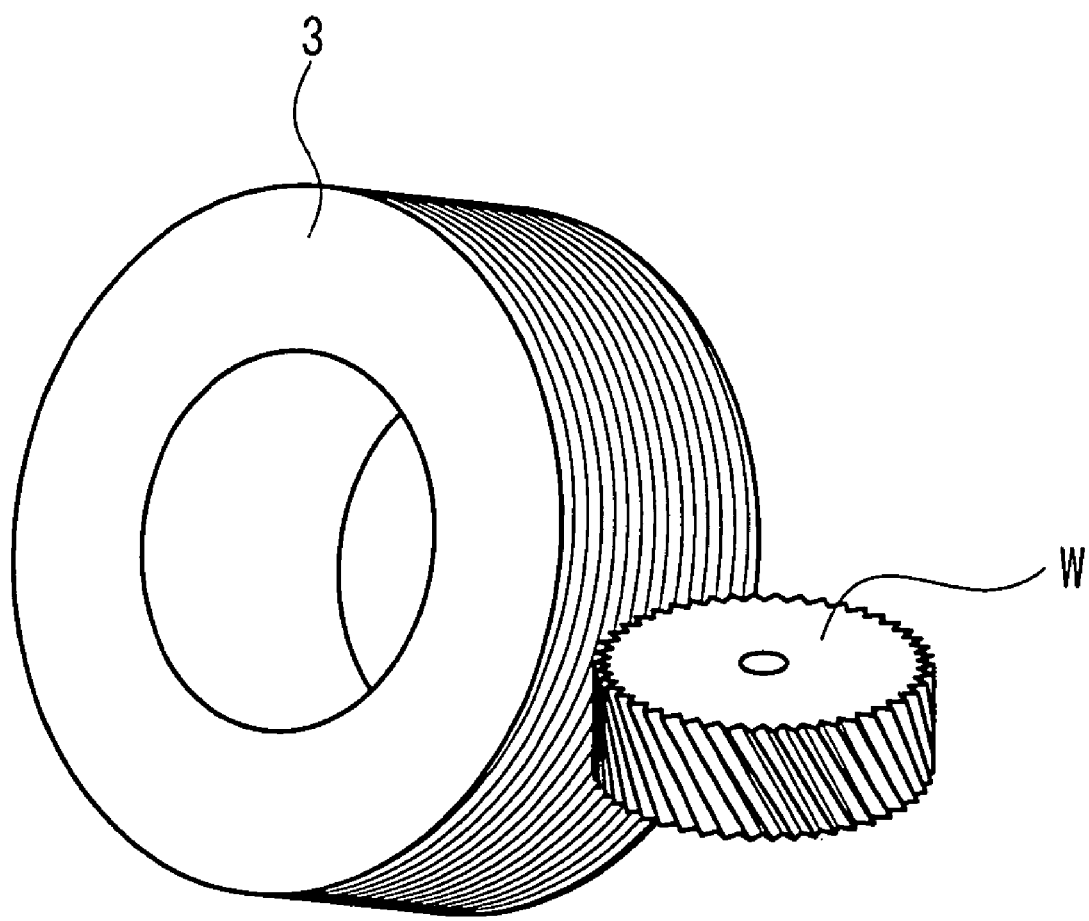
FIG. 4 is a perspective view showing the state of grinding a gear.

FIG. 4 is a perspective view showing a state in which the threaded grinding wheel 3 and the work W are in engagement for gear grinding.

Figure 5:
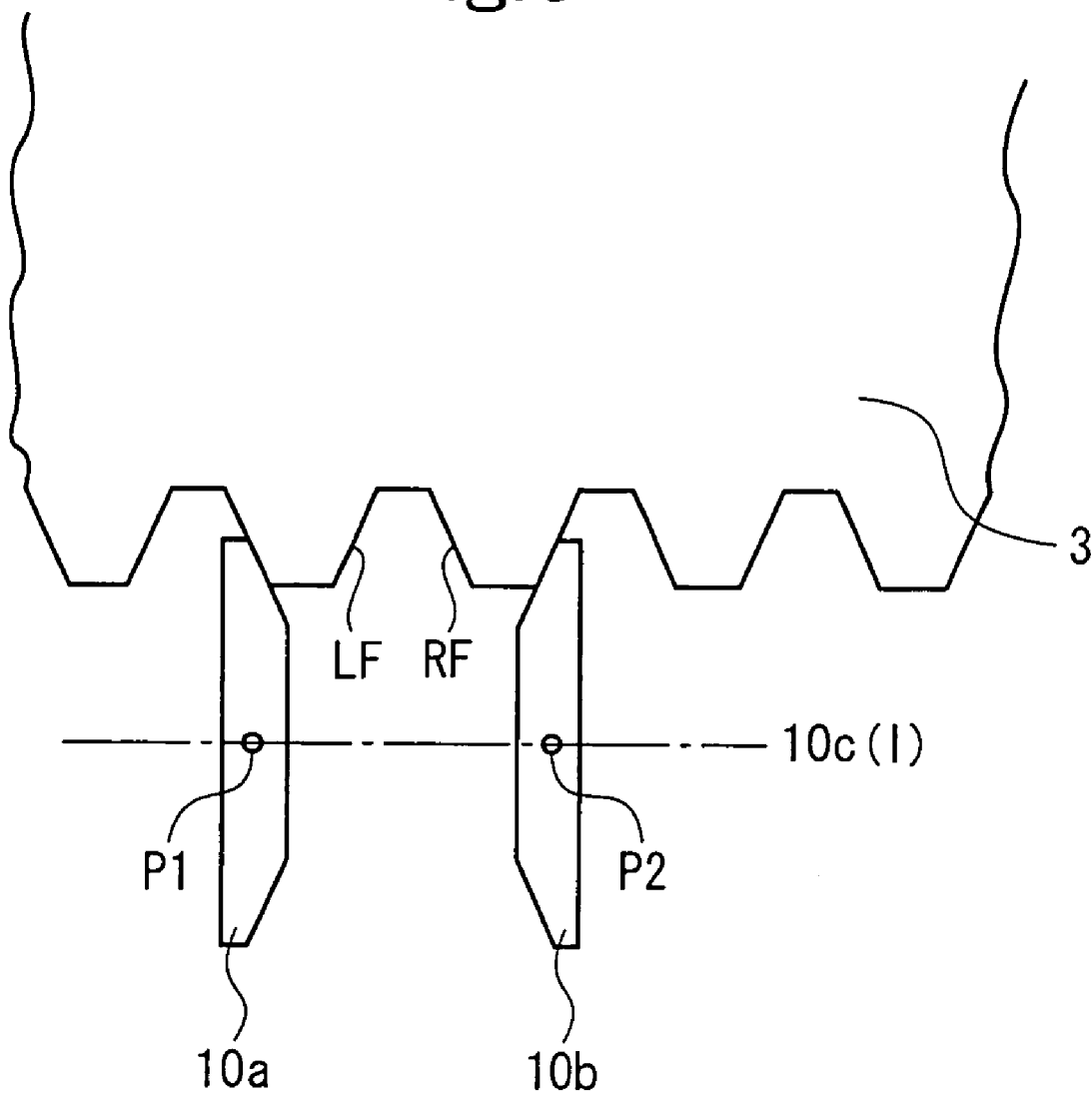
FIG. 5 is a schematic view showing the state of dressing.

FIG. 5 is a schematic view showing the state of dressing.

In FIG. 1, reference numeral 1 is a bed, 2 is a column, 3 is the threaded grinding wheel for grinding the work, 4 is the table on which the work is placed and held, 5 is the counter column (tailstock) erected on the bed 1, 6 is a turning ring (annular member) revolvably provided on the outer periphery of a lower part of the counter column 5, 7 and 8 are grippers for carrying-in and carrying-out of the work, and 10 is the rotary dressing device for dressing the threaded grinding wheel 3.

The table 4 is provided at a position facing the column 2 (i.e., a work machining position), and the column 2 moves forward and backward on the bed 1 toward and away from a first axis C1 (table 4) shown in FIG. 2(a) (namely, the column 2 slides in an X-direction). The column 2 has a grinding spindle 14 as a wheel spindle for mounting the threaded grinding wheel 3. The table 4 rotates in directions of arrows C about the first axis C1 shown in FIG. 2(a) (i.e., rotates about a vertical axis).

The counter column 5 has the function of pressing the work, placed on the table 4, from above, and has a tailstock instrument (not shown) which ascends and descends in an up-and-down direction above the face of the table 4 to press the work from above.

As shown in FIG. 2(a), the turning ring (annular member) 6, which is turned about a second axis O in directions of arrows B (FIG. 1) by a drive means (not shown), is provided on the outer periphery of the counter column 5. The pair of grippers 7 and 8, which are holders of the work, and the rotary dressing device 10 are provided on the turning ring 6.

The pair of grippers 7 and 8 are provided symmetrically with respect to the second axis O for carrying the work W into and out of the site on the table 4. The grippers 7 and 8 have such a mechanism that a pair of opening and closing forks 7a, 7a or 8a, 8a grip the work W from both sides of it, and hold it.

The turning ring 6 is desirably provided on the outer periphery of the lower part of the counter column 5 in consideration of a height which makes it easy for the grippers 7, 8 to carry the work W into and out of the site on the table 4.

The rotary dressing device 10 is provided between the grippers 7 and 8, and is preferably provided at a central (90-degree) position between the grippers 7 and 8, with the second axis O as the center.

The rotary dressing device 10 is furnished with the pair of disk-shaped dressing tools 10a and 10b which are rotationally driven about a dresser axis 10c.

The column 2 has, on a side surface (front surface) thereof facing the table 4, a vertical slide 11 slidable parallel to the first axis C1 (i.e., in a Z-direction), a turning head 12 capable of axially turning on the front surface of the vertical slide 11 in directions of arrows A (i.e., capable of turning about an X-axis and capable of turning in a Y-Z plane), and a grinding slider 13 sliding on the front surface of the turning head 12 in a direction perpendicular to the first axis C1 (i.e., in a Y-direction) The above axial turns in the A-direction mean motions which tilt the whole of the grinding spindle 14. The grinding spindle 14 rotates about a grinding wheel axis 3a, thereby enabling the work W to be ground by the threaded grinding wheel 3.

The bed 1, the column 2, the vertical slide 11, the turning head 12, the grinding slider 13, and the grinding spindle 14 constitute a moving mechanism, and the respective portions of this moving mechanism have their moving positions numerically controlled by an NC device 100.

The turning head 12 is provided with a coolant nozzle 9, through which a grinding fluid is discharged from above a site of grinding during grinding of the work W and the threaded grinding wheel 3 to ensure smoothness of grinding, exclusion of grinding swarf, and cooling.

The movements in the directions of X, Y, Z, A and C of the above-mentioned moving mechanism, the rotational driving of the threaded grinding wheel 3 by the grinding spindle 14, and the rotational driving of the table 4 are numerically controlled by the NC device 100, whereby the threaded grinding wheel 3 grinds the work W on the table 4.

The carry-in, carry-out, and machining actions for the work W will be described based on FIGS. 2(a), 2(b) and 2(c).

FIG. 2(a) is a view showing a state in which the work W is carried into the site on the table 4 on the side of the gripper 7, and a work W1 to be ground next is gripped on the side of the gripper 8.

The gripper 7 is lowered by a predetermined distance by a moving means (not shown) to install the work W at a work mounting instrument (work arbor) on the table 4. After gripping by the gripper 7 is released, the work W is fixed to and supported on the work arbor by a clamping device (not shown). Then, the movements in the directions of X, Y, Z, A and C of the moving mechanism, the rotational driving of the threaded grinding wheel 3, and the rotational driving of the table 4 are numerically controlled, whereby the threaded grinding wheel 3 grinds the work W to produce a gear W2. FIG. 4 shows the state of the threaded grinding wheel 3 and the work W relative to each other during grinding.

At this time, synchronization between the moving motion in the Z-axis direction of the threaded grinding wheel 3 being rotationally driven and the rotary motion of the table 4, on which the work (gear) W is installed, is adjusted, whereby the helix angle (form of helix trace) formed in the work (gear) W can be adjusted.

Then, the fixing and supporting of the gear W2 on the work arbor are released, and the gear W2 is gripped by the gripper 7. The gripper 7 is raised by a predetermined distance by the moving means to separate the gear W2 from the work arbor. Then, the turning ring 6 is rotated clockwise (in a direction of an arrow D) through 180 degrees to attain the state shown in FIG. 2(b). At this time, the gripper 8 grips the work W1 to be ground next, and the gripper 8 carries the work W1 into the site on the table 4, and the gripper 7 carries the completed gear W2 out.

By repeating the actions shown in FIGS. 2(a) and 2(b) alternately, several tens of gears are produced continuously. Then, the turning ring 6 is turned from the state of FIG. 2(b) clockwise through 90 degrees in the direction of an arrow F to attain the states shown in FIG. 2(c) and FIG. 3. That is, the rotary dressing device 10 is brought face-to-face with the threaded grinding wheel 3. The dressing tools 10a, 10b are rotationally driven about the dresser axis 10c. Further, the movements in the directions of X, Y, Z, A and C and the rotational driving of the threaded grinding wheel 3 are numerically controlled in the same manner as for machining of the work W, whereby the threaded grinding wheel 3 is ground by the dressing device 10 for regeneration.

The timing of dressing of the threaded grinding wheel 3 by the rotary dressing device 10 is set beforehand in the NC device 100 of the gear grinding machine before execution of grinding, with the number of the works W to be ground continuously by the threaded grinding wheel 3 being set at a predetermined number. By so doing, the actions shown in FIGS. 2(a) and 2(b) are repeated alternately so that the threaded grinding wheel 3 machines the predetermined number of the works W continuously. After the predetermined number of the works W are continuously machined, the turning ring 6 is turned and brought to the state of FIG. 2(c). As a result, the rotary dressing device 10 faces the threaded grinding wheel 3, making it possible for the rotary dressing device 10 to dress the threaded grinding wheel 3.

Dressing is performed by rotationally driving the dressing tools 10a and 10b about the dresser axis 10c, and numerically controlling the movements in the directions of X, Y, Z, A and C of the threaded grinding wheel 3 and the rotational driving of the threaded grinding wheel 3.

In this manner, the disk-shaped dressing tools 10a and 10b being rotationally driven are brought into contact with the flanks of the threads of the threaded grinding wheel 3 being rotated, whereby dressing of the threaded grinding wheel 3 can be carried out.

FIG. 5 schematically shows a state in which the threaded grinding wheel 3 is dressed by the dressing tools 10a, 10b.

In FIG. 5, assume that the dressing tool 10a can turn (turn about the Z-axis) about a position P1, and the dressing tool 10b can turn (turn about the Z-axis) about a position P2. In this case, the wheel pressure angle of the threaded grinding wheel 3 can be modified by turning the dressing tools 10a, 10b about the Z-axis.

With the aforementioned gear grinding machine having a block gauge, the wheel pressure angle can be modified by such a technique. By so modifying the wheel pressure angle, the gear pressure angle (tooth profile) of the work (gear) W can be modified.

The method of correcting the tooth profile error by modifying the wheel pressure angle in the above-described manner is called "the first tooth profile error correction method".

Alternatively, the wheel pressure angle of the threaded grinding wheel 3 can be changed in the manner described below, without turning the dressing tools 10a, 10b about the Z-axis.

That is, with the position of the rotary dressing device 10 (i.e., dressing tools 10a, 10b) being fixed, and the dressing tools 10a, 10b being kept in contact with the flanks of the threads of the threaded grinding wheel 3, the threaded grinding wheel 3 is located at a predetermined position in an orthogonal coordinate system (in a direction along the X-axis and the Z-axis), and the threaded grinding wheel 3 is turned through a predetermined angle in the direction of the arrow A. By these measures, the wheel pressure angle of the threaded grinding wheel 3 to be dressed by the dressing tools 10a, 10b can be changed.

In other words, "the positions of the dressing tools 10a, 10b are fixed, while the orthogonal coordinate position and the turning angle in the direction of the arrow A of the threaded grinding wheel 3 are changed". This procedure attains a state equivalent to the state in which "the position of the threaded grinding wheel 3 is fixed, while the dressing tools 10a, 10b are turned about the Z-axis", in order to change the wheel pressure angle.

The method of correcting the tooth profile error by modifying the wheel pressure angle in the above-described manner is called "the second tooth profile error correction method".

Concrete methods for this purpose will be described with reference to FIGS. 6(a) to 6(c).

In performing ordinary dressing, a line connecting the center $O_1$ of the threaded grinding wheel 3 (the central point of the grinding wheel axis 3a) and the center $O_2$ of the dressing tools 10a, 10b (the central point of the dresser axis 10c) is rendered horizontal, as shown in FIG. 6(a). At this time, a center distance, which is the distance between the centers $O_1$ and $O_2$, is D.

To change the wheel pressure angle of the threaded grinding wheel 3, the positions of the dressing tools 10a, 10b are fixed at the same positions as in FIG. 6(a), and the center distance as the distance between the centers $O_1$ and $O_2$ is kept to be D (namely, the dressing tools 10a, 10b are kept in contact with the flanks of the threads of the threaded grinding wheel 3). Under these conditions, the position in the X-direction and the position in the Z-direction of the threaded grinding wheel 3 are changed, and the position in the A-direction of the threaded grinding wheel 3 (its turning position about the X-axis, namely, its turning position in the Y-Z plane) is also changed, for example, as shown in FIG. 6(b). In the example of FIG. 6(b), the threaded grinding wheel 3 and the dressing tools 10a, 10b are in contact at the lower-half portions of the threads of the threaded grinding wheel 3.

Thus, for example, the wheel pressure angle at the right flank RF (see FIG. 5) of the threaded grinding wheel 3 dressed by the dressing tool 10a is large, and the wheel pressure angle at the left flank LF (see FIG. 5) of the threaded grinding wheel 3 dressed by the dressing tool 10b is small, although this is dependent partly on the direction of inclination of the threads formed in the threaded grinding wheel 3.

At this time, the increase (numerical value) in the wheel pressure angle at the right flank RF is equal to the decrease (numerical value) in the wheel pressure angle at the left flank LF.

How much the threaded grinding wheel 3 should be moved along its positions in the directions of X, Z and A in order to change the wheel pressure angle by a predetermined angle can be found analytically.

It goes without saying that the threaded grinding wheel 3 is moved along its positions in the directions of X, Z and A by moving the column 2, the vertical slide 11, and the turning head 12 while controlling their positions in the NC mode by the NC device 100.

In carrying out dressing, the positions of the threaded grinding wheel 3 in the directions of X, Z and A are maintained in the state shown in FIG. 6(b), and contact adjustment is made until the dressing tools 10a, 10b contact the flanks of the threads of the threaded grinding wheel 3 (namely, the threaded grinding wheel 3 is moved in the Y-direction). Then, the threaded grinding wheel 3 is continuously lead-fed in the Y-direction in accordance with the lead of the threads formed in the threaded grinding wheel 3.

To change the wheel pressure angle of the threaded grinding wheel 3 in a direction opposite to the direction shown in FIG. 6(b), the positions of the dressing tools 10a, 10b are fixed at the same positions as in FIG. 6(a), and the center distance as the distance between the centers $O_1$ and $O_2$ is kept to be D. Under these conditions, the position in the X-direction and the position in the Z-direction of the threaded grinding wheel 3 are changed, and the position in the A-direction of the threaded grinding wheel 3 (its turning position about the X-axis, namely, its turning position in the Y-Z plane) is also changed, for example, as shown in FIG. 6(c). In the example of FIG. 6(c), the threaded grinding wheel 3 and the dressing tools 10a, 10b are in contact at the upper-half portions of the threads of the threaded grinding wheel 3.

Thus, for example, the wheel pressure angle at the right flank RF (see FIG. 5) of the threaded grinding wheel 3 dressed by the dressing tool 10a is small, and the wheel pressure angle at the left flank LF (see FIG. 5) of the threaded grinding wheel 3 dressed by the dressing tool 10b is large, although this is dependent partly on the direction of inclination of the threads formed in the threaded grinding wheel 3.

At this time, the decrease (numerical value) in the wheel pressure angle at the right flank RF is equal to the increase (numerical value) in the wheel pressure angle at the left flank LF.

How much the threaded grinding wheel 3 should be moved along its positions in the directions of X, Z and A in order to change the wheel pressure angle by a predetermined angle can be found analytically.

It goes without saying that the threaded grinding wheel 3 is moved along its positions in the directions of X, Z and A by moving the column 2, the vertical slide 11, and the turning head 12 while controlling their positions in the NC mode by the NC device 100.

In carrying out dressing, the positions of the threaded grinding wheel 3 in the directions of X, Z and A are maintained in the state shown in FIG. 6(c), and contact adjustment is made until the dressing tools 10a, 10b contact the flanks of the threads of the threaded grinding wheel 3 (namely, the threaded grinding wheel 3 is moved in the Y-direction). Then, the threaded grinding wheel 3 is continuously lead-fed in the Y-direction in accordance with the lead of the threads formed in the threaded grinding wheel 3.

In this manner, the wheel pressure angle at the right flank and that at the left flank of the threaded grinding wheel 3 can be increased for one of the right and left flanks, and decreased for the other flank. Furthermore, the increase and the decrease (numerical values) in the wheel pressure angle can be equated with each other.

In FIGS. 6(a) to 6(c), if the wheel pressure angle is increased (decreased) at the right flank RF, the wheel pressure angle is decreased (increased) at the left flank LF. According to the following "third tooth profile error correction method", the wheel pressure angles at the right and left flanks are both increased, or both decreased.

During ordinary dressing, the distance over which the threaded grinding wheel 3 is continuously moved in the Y-direction (moving distance in the Y-direction per rotation) is equated with the lead of the threads formed in the threaded grinding wheel 3. According to the third tooth profile error correction method, by contrast, the distance over which the threaded grinding wheel 3 is continuously moved in the Y-direction (moving distance in the Y-direction per rotation) during dressing is rendered slightly longer or shorter than the lead of the threads formed in the threaded grinding wheel 3.

As has been well known thus far, if the moving distance of the threaded grinding wheel 3 in the Y-direction per rotation is longer than the lead of the threads of the threaded grinding wheel 3, the wheel pressure angles at the right and left flanks RF and LF of the threaded grinding wheel 3 dressed by the dressing tools 10a, 10b are both decreased by the same angle (numerical value), for example, although this is also dependent on the direction of the inclination of the threads formed in the threaded grinding wheel 3. If the moving distance of the threaded grinding wheel 3 in the Y-direction per rotation is shorter than the lead of the threads of the threaded grinding wheel 3, on the other hand, the wheel pressure angles at the right and left flanks RF and LF of the threaded grinding wheel 3 dressed by the dressing tools 10a, 10b are both increased by the same angle (numerical value), for example, although this is also dependent on the direction of the inclination of the threads formed in the threaded grinding wheel 3.

Furthermore, the second tooth profile error correction method and the third tooth profile error correction method can be combined.

That is, (1) The moving distance of the threaded grinding wheel 3 in the Y-direction per rotation is adjusted; and (2) With the positions of the dressing tools 10a, 10b being fixed at the same positions as in FIG. 6(a), and the center distance as the distance between the centers $O_1$ and $O_2$ being kept to be D, the position in the X-direction, and the position in the Z-direction of the threaded grinding wheel 3 are changed.

By taking these measures, the wheel pressure angles at the right and left flanks RF and LF can be increased or decreased to arbitrary angles.

EMBODIMENT

In the Embodiment of the present invention, if the measurement of the dimensions of a gear, which has been produced by grinding by means of the gear grinding machine shown in FIG. 1, shows a gear shape error, the actions of the gear grinding machine are modified by modification and computing function units of the NC device 100 in the manner described below.

Figure 7:
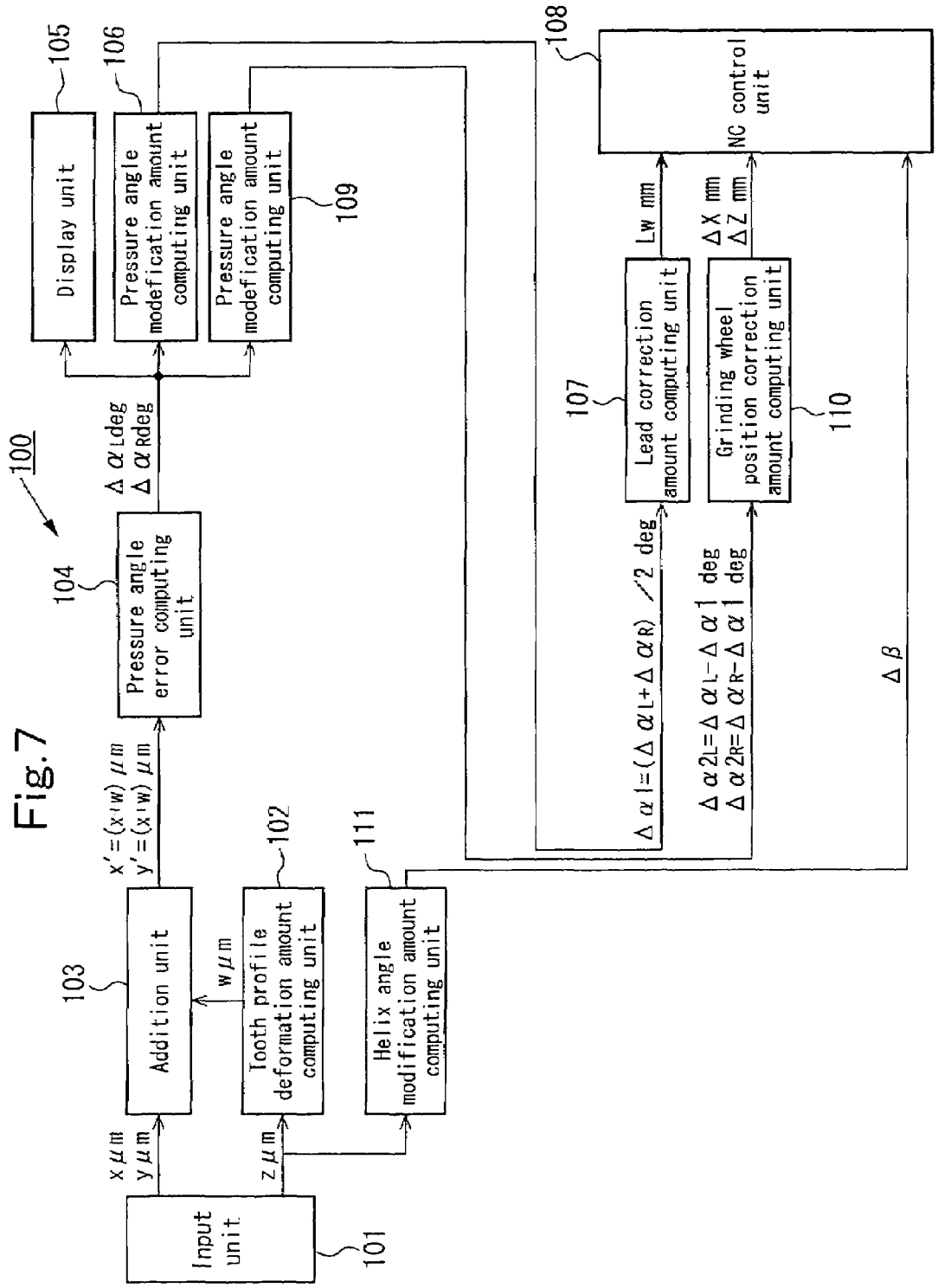
FIG. 7 is a block diagram showing the computing functions of an embodiment of the present invention.

FIG. 7 shows modification and computing function units extracted from the computing function units of the NC device 100. Needless to say, the NC device 100 exercises ordinary numerical control, namely, numerical control of the movements in the X, Y, Z, A and C directions of the moving mechanism, the rotational driving of the threaded grinding wheel 3 by the grinding spindle 14, and the rotational driving of the table 4. However, such ordinary NC function units are not shown.

According to the present embodiment, the dimensions of a gear produced by grinding are measured by a measuring device or the like. If the measurements show a gear shape error (tooth profile error, helix form deviation), an operator inputs the gear shape error into the modification and computing function units of the NC device 100 via an input unit 101 of the NC device 100.

Concretely, a tooth profile error (data) x μm of the left tooth flank, a tooth profile error (data) y μm of the right tooth flank, and a helix form deviation (data) z μm are inputted.

A tooth profile deformation amount computing unit 102 finds a tooth profile deformation amount w μm, which has been generated when synchronization (synchronization between the moving motion in the Z-axis direction of the threaded grinding wheel 3 and the rotary motion of the table 4 having the work installed thereon) is modified to eliminate the helix form deviation z μm, by a preset operation expression.

An addition unit 103 adds the above tooth profile deformation amount w μm to each of the inputted tooth profile errors x μm and y μm to obtain total tooth profile errors x' μm and y' μm. That is, x'=x+w and y'=y+w.

A pressure angle error computing unit 104 finds pressure angle errors $\Delta\alpha_L$ deg and $\Delta\alpha_R$ deg corresponding to the total tooth profile errors x' μm and y' μm.

The pressure angle errors $\Delta\alpha_L$ deg and $\Delta\alpha_R$ deg are displayed in a display unit 105. The operator sees the pressure angle errors $\Delta\alpha_L$ deg and $\Delta\alpha_R$ deg displayed in the display unit 105 and, in an attempt to eliminate these pressure angle errors $\Delta\alpha_L$ deg and $\Delta\alpha_R$ deg, turns the dressing tools 10a, 10b about the z-axis to change the wheel pressure angle of the threaded grinding wheel 3 in accordance with the "first tooth profile error correction method". As a result, the pressure angle errors $\Delta\alpha_L$ deg and $\Delta\alpha_R$ deg can be removed.

A pressure angle modification amount computing unit 106 finds a pressure angle modification amount $\Delta\alpha 1$ deg which is used when employing the "third tooth profile error correction method", a method in which the pressure angle is modified by modifying the moving distance in the Y-direction (lead) of the threaded grinding wheel 3 per rotation of the threaded grinding wheel 3. At this time, $\Delta\alpha 1=(\Delta\alpha_L+\Delta\alpha_R)/2$.

A lead correction amount computing unit 107 finds a lead correction amount $L_w$ mm corresponding to the pressure angle modification amount $\Delta\alpha 1$ deg.

An NC control unit 108 exercises lead-feed numerical control so as to correct the moving distance in the Y-direction (lead) of the threaded grinding wheel 3, during dressing of the threaded grinding wheel 3, by the lead correction amount $L_w$ mm, when making a tooth profile error correction by the "third tooth profile correction method".

A pressure angle modification amount computing unit 109 finds a pressure angle modification amount $\Delta\alpha 2_L$ deg at the right tooth flank and a pressure angle modification amount $\Delta\alpha 2_R$ deg at the left tooth flank, which are used when employing the "second tooth profile error correction method", a method in which the pressure angle is modified by modifying the position in the X-axis direction and the position in the Z-axis direction of the threaded grinding wheel 3. At this time, $\Delta\alpha 2_L=\Delta\alpha_L-\Delta\alpha 1$ deg $\Delta\alpha 2_R=\Delta\alpha_R-\Delta\alpha 1$ deg On this occasion, $\Delta\alpha 2_L=-\Delta\alpha 2_R$ A grinding wheel position correction amount computing unit 110 finds grinding wheel position correction amounts $\Delta X$ mm and $\Delta Z$ mm corresponding to the pressure angle modification amounts $\Delta\alpha 2_L$ deg and $\Delta\alpha 2_R$ deg.

The NC control unit 108 numerically controls the position of the threaded grinding wheel 3 so as to correct the position in the X-direction and the position in the Z-direction of the threaded grinding wheel 3, during dressing of the threaded grinding wheel 3, by $\Delta X$ mm and $\Delta Z$ mm while dressing the threaded grinding wheel 3 by the dressing device 10, when making a tooth profile error correction by the "second tooth profile correction method".

Upon receipt of the helix form deviation z μm, a helix angle modification amount computing unit 111 finds a helix angle modification amount $\Delta\beta$ necessary for correcting the helix form deviation z μm.

When the NC control unit 108 is synchronizing the moving motion in the Z-axis direction of the threaded grinding wheel 3 and the rotary motion of the table 4 by numerical control so that a helix angle of β is obtained, the NC control unit 108 modifies the synchronization between the moving motion in the Z-axis direction of the threaded grinding wheel 3 and the rotary motion of the table 4 by numerical control so that the helix angle will become $\beta-\Delta\beta$.

In the above-described manner, the helix form deviation z μm can be corrected and removed, and the tooth profile errors x μm and y μm can be corrected and removed.

If correction of the helix form deviation (i.e., modification of the helix angle) is made when employing the "third tooth profile error correction method", a method in which the pressure angle is modified by modifying the moving distance in the Y-direction (lead) of the threaded grinding wheel 3 per rotation of the threaded grinding wheel 3, the tooth profile error changes (the pressure angle changes) inevitably as a result of the correction of the helix form deviation. An example of the tooth profile error change will be indicated by mathematical expressions.

| | |
|---|---|
| Normal helix angle | β1 |
| Normal pressure angle | αn1 |
| Normal transverse pressure angle | αs1 |
| Normal pitch circle diameter | do1 |
| Normal base circle diameter | dg1 |
| Normal lead | Lo1 |
| Helix angle modification amount | Δβ |

Lead after correction $Lo1h = \pi \cdot do1/\tan(\beta1 + \Delta\beta)$

Helix angle after correction $\beta1h = \sin^{-1}(\pi \cdot Mn1 \cdot z1/Lo1h)$ where Mn1 is a module, and z1 is the number of teeth Transverse pressure angle after correction $\alpha s1h = \tan^{-1}(\tan(\alpha n1)/\cos(\beta1h))$ Pitch circle diameter after correction $do1h = Mn1 \cdot z1/\cos(\beta1h)$ Base circle diameter after correction $dg1h = do1h \cdot \cos(\alpha s1h)$ Find a pressure angle which is equal to the pressure angle (αn1h) at the normal base circle (dg1), without changing the lead (Lo1h)

Transverse pressure angle after correction $\alpha s1h = \cos^{-}(dg1 \cdot \cos(\beta1h)/Mn1 \cdot z1)$ Pressure angle after correction $\alpha n1h = \tan^{-1}(\tan(\alpha s1h) \cdot \cos(\beta1h))$ Pressure angle correction amount $\Delta\alpha n1 = \alpha n1h - \alpha n1$ Pressure angle change amount after lead correction $-\Delta\alpha n1$ Thus, a change in the pressure angle after change of the lead, accordingly, the helix angle is $-\Delta\alpha n1$.

The tooth profile deformation amount computing unit 102 finds a tooth profile error, which is necessarily caused when the helix form deviation z μm is corrected, based on the above correction amount $-\Delta\alpha n1$.

As described above, the present invention can be applied to the gear grinding machine which allows the threaded grinding wheel to perform grinding, and which has the rotary dressing device for dressing the threaded grinding wheel. The present invention can be utilized for modifying the actions of the gear grinding machine so as to resolve a gear shape error, if any, in a gear produced by grinding.

According to the present invention, moreover, if there is a helix form deviation and a tooth profile error in a gear produced by grinding, the actions of the gear grinding machine are not modified simply so as to correct the helix form deviation and the tooth profile error, but the actions of the gear grinding machine are modified so as to correct the tooth profile error in consideration of a tooth profile deformation amount which is necessarily generated by correcting the helix form deviation. Thus, the helix form deviation and the tooth profile error can be properly corrected.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear grinding machine, comprising:
a table on which a work is installed, and which rotates about a vertical axis;
a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to the table, a Z-direction being a vertical direction, and a Y-direction being a direction perpendicular to the X-direction and the Z-direction, and to turn the threaded grinding wheel in a Y-Z plane;
an NC device for numerically controlling a movement of the moving mechanism in order to control a position of the threaded grinding wheel mounted on the moving mechanism, and for numerically controlling a rotary motion of the table; and
a rotary dressing device having a disk-shaped dressing tool, and arranged such that when the rotary dressing device is set at a position where the table has been placed, the dressing tool contacts a flank of the threads of the threaded grinding wheel, while being rotationally driven, to perform dressing, and
wherein the NC device has
an input function unit for inputting a tooth profile error and a helix form deviation representing a dimensional error of a gear machined by the gear grinding machine,
a tooth profile deformation amount computing function unit for finding a tooth profile deformation amount generated in the gear when adjusting synchronization between a moving motion in a Z-axis direction of the threaded grinding wheel and the rotary motion of the table so as to correct the helix form deviation,
an addition function unit for adding the inputted tooth profile error and the tooth profile deformation amount to find a total tooth profile error,
a pressure angle error computing function unit for finding a pressure angle error corresponding to the total tooth profile error,
a helix angle modification amount computing function unit for finding a helix angle modification amount necessary for correcting the inputted helix form deviation, and
an NC control function unit for adjusting the synchronization between the moving motion in the Z-axis direction of the threaded grinding wheel and the rotary motion of the table so that a helix angle formed in the work is changed by the helix angle modification amount.

2. A gear grinding machine, comprising:
a table on which a work is installed, and which rotates about a vertical axis;
a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to the table, a Z-direction being a vertical direction, and a Y-direction being a direction perpendicular to the X-direction and the Z-direction, and to turn the threaded grinding wheel in a Y-Z plane;

an NC device for numerically controlling a movement of the moving mechanism in order to control a position of the threaded grinding wheel mounted on the moving mechanism, and for numerically controlling a rotary motion of the table; and a rotary dressing device having a disk-shaped dressing tool, and arranged such that when the rotary dressing device is set at a position where the table has been placed, the dressing tool contacts a flank of the threads of the threaded grinding wheel, while being rotationally driven, to perform dressing, and wherein the NC device has an input function unit for inputting a tooth profile error and a helix form deviation representing a dimensional error of a gear machined by the gear grinding machine, a tooth profile deformation amount computing function unit for finding a tooth profile deformation amount generated in the gear when adjusting synchronization between a moving motion in a Z-axis direction of the threaded grinding wheel and the rotary motion of the table so as to correct the helix form deviation, an addition function unit for adding the inputted tooth profile error and the tooth profile deformation amount to find a total tooth profile error, a pressure angle error computing function unit for finding a pressure angle error corresponding to the total tooth profile error, a pressure angle modification amount computing function unit for finding a pressure angle modification amount necessary for correcting the pressure angle error, a grinding wheel position correction amount computing function unit for finding a grinding wheel position correction amount corresponding to the pressure angle modification amount, a helix angle modification amount computing function unit for finding a helix angle modification amount necessary for correcting the inputted helix form deviation, and an NC control function unit for adjusting the synchronization between the moving motion in the Z-axis direction of the threaded grinding wheel and the rotary motion of the table so that a helix angle formed in the work is changed by the helix angle modification amount, and for modifying the position of the threaded grinding wheel by the grinding wheel position correction amount in correcting the tooth profile error by adjusting a position in the X-direction, a position in the Z-direction, and a turning position in the Y-Z plane of the threaded grinding wheel, while keeping the dressing tool in contact with the flank of the threads of the threaded grinding wheel.

3. A gear grinding machine, comprising:

a table on which a work is installed, and which rotates about a vertical axis;

a moving mechanism rotatably mounted with a threaded grinding wheel having threads spirally formed on an outer peripheral surface thereof, and arranged to move the threaded grinding wheel along an X-direction being a direction in which the threaded grinding wheel advances or retreats with respect to the table, a Z-direction being a vertical direction, and a Y-direction being a direction perpendicular to the X-direction and the Z-direction, and to turn the threaded grinding wheel in a Y-Z plane;

an NC device for numerically controlling a movement of the moving mechanism in order to control a position of the threaded grinding wheel mounted on the moving mechanism, and for numerically controlling a rotary motion of the table; and a rotary dressing device having a disk-shaped dressing tool, and arranged such that when the rotary dressing device is set at a position where the table has been placed, the dressing tool contacts a flank of the threads of the threaded grinding wheel, while being rotationally driven, to perform dressing, and wherein the NC device has an input function unit for inputting a tooth profile error and a helix form deviation representing a dimensional error of a gear machined by the gear grinding machine, a tooth profile deformation amount computing function unit for finding a tooth profile deformation amount generated in the gear when adjusting synchronization between a moving motion in a Z-axis direction of the threaded grinding wheel and the rotary motion of the table so as to correct the helix form deviation, an addition function unit for adding the inputted tooth profile error and the tooth profile deformation amount to find a total tooth profile error, a pressure angle error computing function unit for finding a pressure angle error corresponding to the total tooth profile error, a pressure angle modification amount computing function unit for finding a pressure angle modification amount necessary for correcting the pressure angle error, a lead correction amount computing function unit for finding a lead correction amount corresponding to the pressure angle modification amount, a helix angle modification amount computing function unit for finding a helix angle modification amount necessary for correcting the inputted helix form deviation, and an NC control function unit for adjusting the synchronization between the moving motion in the Z-axis direction of the threaded grinding wheel and the rotary motion of the table so that a helix angle formed in the work is changed by the helix angle modification amount, and for modifying a moving distance in the Y-direction of the threaded grinding wheel per rotation of the threaded grinding wheel by the lead correction amount to adjust the moving distance in the Y-direction of the threaded grinding wheel per rotation of the threaded grinding wheel.

* * * * *